No. 783,752. Patented February 28, 1905.

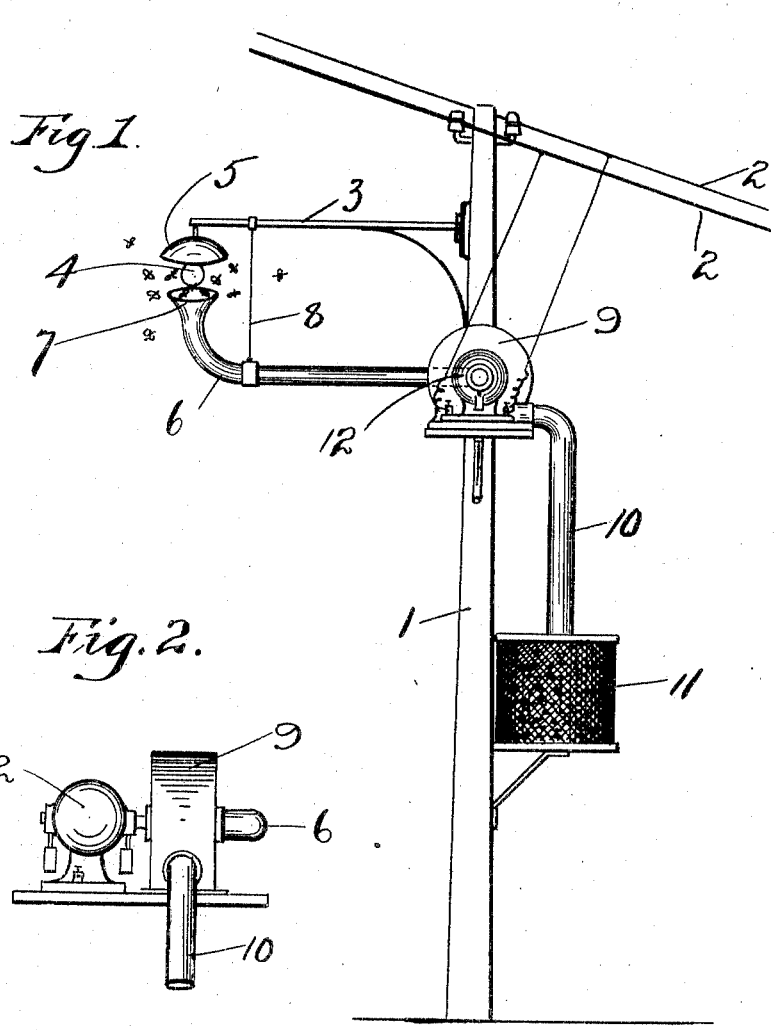

UNITED STATES PATENT OFFICE.

DUDLEY J. MARSTON, OF AMESBURY, MASSACHUSETTS, ASSIGNOR OF ONE-HALF TO GEORGE H. BRIGGS, OF AMESBURY, MASSACHUSETTS.

APPARATUS FOR COLLECTING INSECTS.

SPECIFICATION forming part of Letters Patent No. 783,752, dated February 28, 1905.

Application filed September 20, 1904. Serial No. 225,222.

*To all whom it may concern:*

Be it known that I, DUDLEY J. MARSTON, a resident of the town of Amesbury, in the county of Essex and State of Massachusetts, have invented certain new and useful Improvements in Apparatus for Collecting Insects; and I do hereby declare that the following is a full, clear, and exact description thereof, reference being had to the accompanying drawings, and to the figures of reference marked thereon, which form a part of this specification.

This invention relates to apparatus for collecting insects mechanically, and has for its object to produce an apparatus that will attract insects together and then draw and deposit them by means of a current of air into a receptacle in which they may be removed or exterminated.

The device is more particularly designed to catch flying insects by night, said insects being attracted by the use of a light around which they congregate, then by the use of an induced current of air they are drawn through a tube and deposited into a suitable receptacle.

A practical embodiment of the invention is represented in the accompanying drawings, forming a part of this specification, in which similar characters of reference indicate corresponding parts in both views.

In the drawings, Figure 1 represents a practical embodiment of my invention, showing an electric light and means for drawing the insects from beneath the light, including a pipe and a blower and a wire receptacle in which said insects are deposited. Fig. 2 shows a front view of the blower with an actuating-motor attached thereto.

In the drawings at 1 is the ordinary electric-light pole supporting the current-supplying wires 2 2 on its upper end.

At 3 is the usual outwardly-extending arm supported from the upper end of said pole, from the outer end of which arm is suspended an electric lamp 4. An incandescent light is shown in the drawings; but an arc-light or any other light would answer my purpose equally well. Above the light is shown the ordinary reflector 5 for throwing the light downward. Below this lamp is located a conductor-pipe 6, preferably having an enlarged or flaring mouth 7. This conductor may be suspended at its outer end from the outwardly-extending arm 3 by the pendant 8, if desired, and is preferably made of glass or other suitable transparent material, so as not to obstruct the rays of light. The conductor extends back to a blower 9, located on the pole 1, and then continues on from the blower through the pipe 10 to the receptacle 11 below. This receptacle is preferably constructed of wire-netting; but it may be made of any suitable material and in any form which will allow the air to pass out and still retain the insects.

The blower may be located at any convenient place and driven in any convenient manner; but I have illustrated an electric motor connected to the blower, which motor receives its current from the lighting-wires above.

It is well known that large sums of money have been expended annually by the Government and others for the extermination of destructive insects, some of the most destructive of which are the gypsy and brown-tail moths, which fly before they reach their destructive age. I have therefore devised the plan and constructed the above-explained simple device for attracting these insects together by the use of a light, and then by my apparatus, which is placed in close proximity to said light, the said insects are drawn by means of a draft of air through a blower and deposited into a receptacle in which they may be removed or destroyed before they have reached their destructive age. It is found that the simplest and least expensive method is to use the ordinary street-lights as the means for attracting the insects and then place the drawing apparatus close to these lights and on the same pole. By making the tubes of glass the light is unobstructed, thus allowing it to perform the double function of lighting the street and collecting the insects at the same time. The application of this device, however, is not confined to street-lights, as the apparatus may be set up and operated in a garden or orchard or, in fact, wherever the destroying insects may be found to predominate.

Having thus described my invention, what I claim as new, and desire to secure by Letters Patent, is—

1. An insect-collecting apparatus comprising a light, a receptacle, a transparent conductor and mechanical means for producing a draft of air for collecting and conducting insects from the light into the said receptacle.

2. An apparatus comprising a light, a transparent conductor, means for supporting the mouth of said conductor in proximity to said light, a receptacle, a blower for producing a draft of air for collecting and conducting insects from the light into said receptacle and means for actuating said blower.

In testimony whereof I have hereunto set my hand this 17th day of September, A. D. 1904.

DUDLEY J. MARSTON.

In presence of—
   DELL W. DOLBIER,
   ROBERT C. CLARK.